United States Patent van der Sluys et al.

[11] Patent Number: 4,567,736
[45] Date of Patent: Feb. 4, 1986

[54] ABSORPTION HEAT PUMP

[75] Inventors: Willem L. N. van der Sluys; Jacobus Pastoor; Johannus C. M. Roelofs, all of Eindhoven, Netherlands

[73] Assignee: U.S. Philips Corporation, New York, N.Y.

[21] Appl. No.: 728,429

[22] Filed: Apr. 29, 1985

[30] Foreign Application Priority Data

Oct. 30, 1984 [NL] Netherlands .................. 8403280

[51] Int. Cl.⁴ .................................................. F25B 15/00
[52] U.S. Cl. ........................................ 62/476; 62/494
[58] Field of Search ............... 62/476, 494, 497, 495, 62/496

[56] References Cited

U.S. PATENT DOCUMENTS

| | | | |
|---|---|---|---|
| 3,353,369 | 11/1967 | Whitlow | 62/476 X |
| 4,338,268 | 7/1982 | Wilkinson et al. | 62/494 X |
| 4,467,623 | 8/1984 | Reimann | 62/476 X |
| 4,477,396 | 10/1984 | Wilkinson | 62/494 |

Primary Examiner—Lloyd L. King
Attorney, Agent, or Firm—Rolf E. Schneider

[57] ABSTRACT

An absorption heat pump comprising a heat-mass-exchanger (57) which is arranged in an absorber (3) and has a metal pipe (77) to which a metal fin is secured. The metal fin consists of a number of interconnected lamellae (81) which are helically wound around the pipe (77), while adjacent lamellae (81) of successive turns overlap each other in part, viewed in the circumferential direction of the pipe (77). The finned pipe (77) yields a comparatively strong heat-mass transfer in the absorber (3).

5 Claims, 7 Drawing Figures

ABSORPTION HEAT PUMP

The invention relates to an absorption heat pump comprising a generator and absorber arranged in a first circuit for a solution of work medium and solvent and a condenser and evaporator arranged in a second circuit for the work medium, in which a first outlet of the generator is connected to the condenser and an outlet of the evaporator is connected to a first inlet of the absorber, which is connected through an outlet to an inlet of the generator, said heat pump being provided with at least one heat-mass-exchanger for varying the temperature and the composition of the solution present therein.

In a known absorption heat pump of the kind mentioned in the opening paragraph (see the blook "Die Kleinkältemaschine" of R. Plank and J. Kuprianoff, p. 362–365, published in 1960), the absorber and the evaporator are provided with a cascade comprising dishes having passages for the liquid solution and the liquid work medium, respectively. These dishes are arranged in parallel horizontal planes in a vertical circular-cylindrical holder and each cover a complete cross-section of the holder. In the absorber, heat is extracted from the comparatively cold solution at a comparatively low pressure during the absorption of work medium in vapour form by the liquid solution, after which this heat is radially dissipated via the dish-shaped bodies to the wall of the holder and is transferred there to a liquid cooling medium, which flows around the outer side of the holder. The temperature and the composition of the solution (concentration of work medium) vary during this process so that a heat-mass-exchanger is concerned. In the evaporator, a heat exchange takes place only via the cascade of dishes.

A disadvantage of the known absorption heat pump is that the radial heat transport by conduction in the dish material takes place over a comparatively large distance, as a result of which a comparatively small heat transfer per unit time is obtained. Moreover, in the absorber the contact of the work medium in vapour form with the film of the solution present on the dishes is not very intimate so that the mass transfer (enrichment) in the absorber is also only moderate.

The invention has for its object to provide an absorption heat pump comprising at least one heat-mass-exchanger, in which both the heat transfer and the mass transfer are improved considerably.

For this purpose, the invention is characterized in that the heat-exchanger in the absorber is constituted by a finned first metal pipe which is vertically arranged in a first holder and to which a metal fin is secured which consists of a number of interconnected lamellae arranged so as to be clear of the holder and wound helically around the first pipe, the adjacent lamellae of successive turns overlapping each other in part, viewed in the circumferential direction of the pipe, while the space between the first holder and the first pipe is connected via the said first inlet to the said outlet of the evaporator and is connected via an outlet to the said inlet of the generator, which is connected via a second outlet to a second inlet of the absorber, the inner space of the first pipe forming part of a transport conduit for a cooling medium.

The film of the solution present on each lamella flows from the relevant lamella downwards, drops being formed which in the cascade of overlapping lamellae fall each time on a subjacent lamella and bring about there an intensive mixing with the film of the solution which is also present on the subjacent lamella. Consequently, the comparatively hot upper layer of the film already considerably enriched by the grazing vapour of work medium from the evaporator is mixed with the comparatively cold lower layer of the film which is poorer in work medium so that the film cools throughout its thickness and absorbs work medium comparatively more uniformly, while the concentration of the work medium is distributed more homogeneously in the film. Moreover, the work medium in vapour form flows on all sides around the falling drops of solution, as a result of which an additional absorption takes place. The absorption heat is dissipated in radial direction to the cooling medium within the first pipe over a comparatively small distance because of the comparatively small radial dimension of the lamellae arranged so as to be clear so that a comparatively large heat transport per unit time is obtained.

It should be noted that on p. 283 of the said book a heat exchanger (condenser) is already described, in which a spiral pipe is used which is provided with helically wound rectangular lamellae. A cooling medium flows in the pipe, while the vapour to be condensed is conducted in the spiral plane radially to the eye of the spiral. There is no direct contact between the two media so that in this case no mass exchange takes place. In addition, the manufacture of such a heat exchanger is comparatively complicated.

A preferred embodiment of the absorption heat pump that can be mass-produced in a simple manner and has comparatively simple connections to and from the absorber is characterized in that the first pipe closed at its upper end surrounds a coaxial second pipe open at both ends, which is in communication through its open upper end with the transport conduit for the cooling medium connected to the space between the first and the second pipe, this cooling medium leaving the second pipe at the lower end.

A further embodiment of the absorption heat pump, in which for standardization purposes both the absorber and the generator are provided with a heat-mass-exchanger having a finned pipe, is characterized in that the generator comprises a third finned metal pipe which is vertically arranged in a second holder and is closed at its upper end, a metal fin secured to the third pipe consisting of a number of interconnected lamellae which are arranged so as to be clear of the second holder and are wound helically around the third pipe, while the space between the second holder and the third pipe is connected near the upper end of the third pipe via a supply to the said outlet of the absorber and is connected near the lower end of the third pipe via an outlet to the second inlet of the absorber, the inner space of the third pipe being in communication with a supply of a gaseous heating medium.

A still further embodiment of an absorption heat pump in which the generator in the second holder is integrated with a dephlegmator, is characterized in that the second holder comprises a coaxial finned fourth metal pipe which is arranged in line with the third pipe and is located above the third pipe and is closed at its end facing the third pipe, a metal fin secured to the fourth pipe consisting of a number of interconnected lamellae which engage the inner wall of the second holder and are helically wound around the fourth pipe wherein the space between the second holder and the third pipe is connected via a supply located near the upper end of the third pipe to the said outlet of the absorber and is connected near the lower end of the third pipe via an outlet to the second inlet of the absorber, while within the fourth pipe there extends a coaxial fifth pipe which is surrounded by the fourth pipe, is open at both ends and is in open communication via its lower end with the said outlet of the absorber and is connected at its upper end to the said inlet of the generator, the space between the second holder and the fourth pipe being connected near the upper end of the fourth pipe to an inlet of the condenser.

A particular embodiment of the absorption heat pump with an optimum heat-mass-exchange in the absorber and generator is characterized in that the lamellae of the first finned pipe in the absorber and the third finned pipe of the generator are provided with capillary passages, the capillary passage of an underlying lamella being situated in a shifted position with respect to the capillary passage of the said underlying lamella.

The invention will be described more fully with reference to the drawing, in which.

Figure 1:
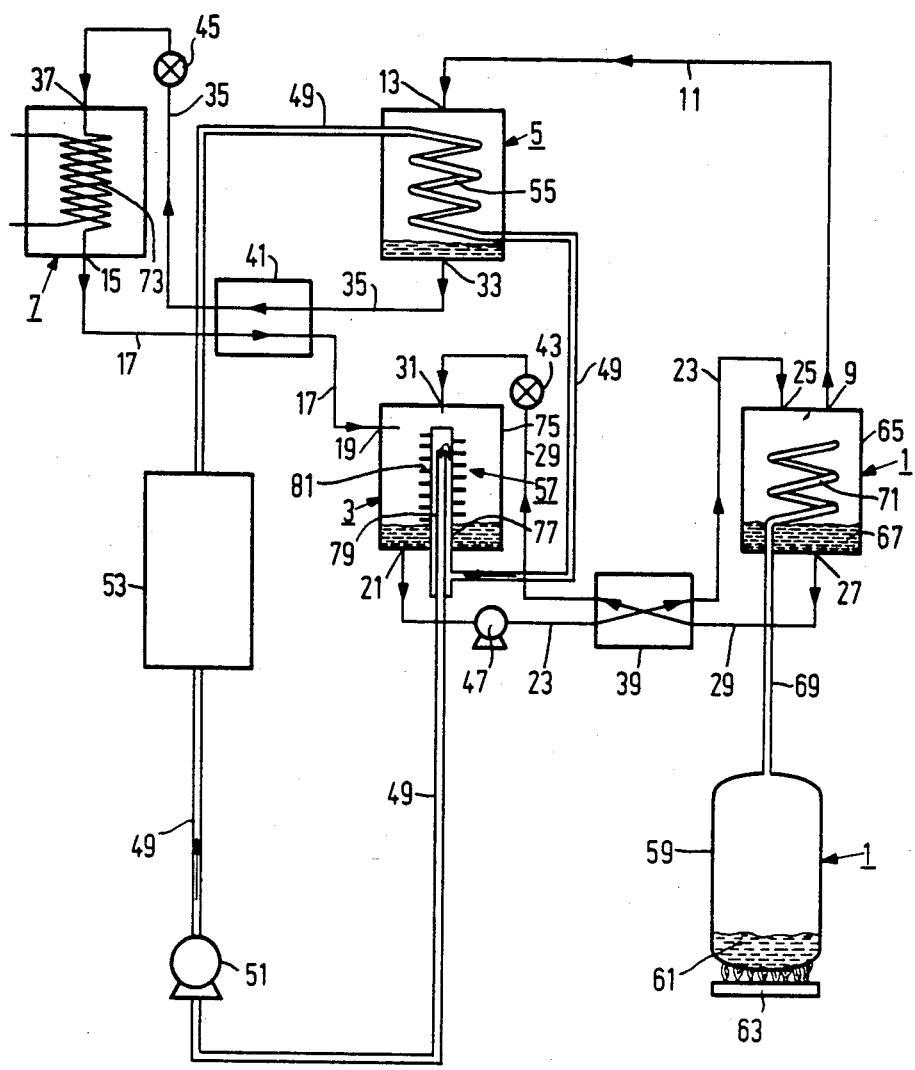
FIG. 1 shows diagrammatically a first embodiment of the absorption heat pump comprising a finned heat-mass-exchanger in the absorber.

The first embodiment of the absorption heat pump shown in FIG. 1 comprises a generator 1 and absorber 3 arranged in a first circuit for a solution of work medium and solvent as well as a condenser 5 and evaporator 7 arranged in a second circuit for the work medium. The work medium used is, for example, ammonia and the solvent used is, for example, water. A first outlet 9 of the generator 1 is connected through a conduit 11 to an inlet 13 of the condenser 5, while an outlet 15 of the evaporator 6 is connected through a conduit 17 to a first inlet 19 of the absorber 3. The absorber 3 is connected via an outlet 21 through a conduit 23 to an inlet 25 of the generator 1. A second outlet 27 of the generator 1 is connected through a conduit 29 to a second inlet 31 of the absorber 3. The condenser 5 is connected via an outlet 33 through a conduit 35 to an inlet 37 of the evaporator 7. The conduits 23 and 29 extend in opposite flow directions through a heat exchanger 39, while the conduits 17 and 35 extend in opposite flow directions through a heat exchanger 41. In the conduit 29 is arranged just in front of the inlet 31 of the absorber 3 an expansion valve 43 and in the conduit 35 is arranged just in front of the inlet 37 of the evaporator 7 an expansion valve 45. The transport or rich solution of ammonia and water in the first circuit from the absorber 3 to the generator 1 takes place by means of a liquid pump 47 arranged in the conduit 23.

The heat pump is provided with a transport conduit 49 for a heating liquid, for example water. The water is circulated in the transport conduit 49 with the aid of a pump 51. Viewed from the pump 51 in the direction of flow of the heating liquid, the latter is transported successively to a heating body 53 for room heating, a heat exchanger 55 arranged in the condenser 5, a heat-mass-exchanger 57 arranged in the absorber 3 and then again to the pump 51. The heat-mass-exchanger 57 in the absorber 3 will be described below with reference to FIGS. 3 to 6.

The generator 1 comprises a boiler 59 containing an evaporation and condensation medium 61, preferably water, which is heated by means of a gas burner 63. The generator 1 further comprises a (second) holder 65, which contains a poor solution 67 of water and ammonia and into which is passed an ascending conduit 69, which is connected to the boiler 59. The part of the ascending conduit 69 located outside the second holder 65 consequently forms a supply of a gaseous heating medium (water vapour). The ascending conduit 69 is closed at its end passed into the holder 65 and is of helical shape. The helical part of the ascending conduit 69 constitutes a heat-mass-exchanger 71, in which by film condensation of water vapour condensation heat is transferred to the rich solution conducted via the inlet 25 to the generator 1. In the evaporator 7 is arranged a heat exchanger 78, by means of which heat is extracted from the environment and is transferred to the liquid ammonia which is supplied via the inlet 37 to the evaporator 7 and evaporates there. The operation of the absorption heat pump described so far is essentially known and is therefore not described in detail.

The absorber 3 has a first circular-cylindrical holder 75 in which the heat-mass-exchanger 57 is arranged. The heat-mass-exchanger 57 comprises a vertically arranged first metal pipe 77 of circular cross-section which is coaxial to the first holder 75 and is closed at its upper and lower end. The pipe 77 is passed through the bottom of the holder 75 to the outside and is connected there near its lower end to the transport conduit 49, which is effectively interrupted at the area of the heat-mass-exchanger 57. Through the closed lower end of the first pipe 77 is passed a circular pipe 79 which is open at both ends and forms part of the transport conduit 49 and acts as a kind of overflow within the first pipe 77. The second pipe 79 is coaxial to the first pipe 77 and is surrounded by the latter. Preferably, the second pipe 79 is thermally insulated (not shown) or made of a thermally insulating material. To the outer wall of the first pipe 77 (see also FIG. 3) is welded a metal fin, which is helically wound around the first pipe 77 and consists of a number of interconnected rectangular lamellae 81. The lamellae 81 are arranged so that their ends are clear of the inner wall of the first holder 75. Adjacent lamellae of successive helically arranged turns overlap each other in part in the circumferential direction (tangential direction) of the first pipe 77 (see also FIG. 4). The space between the first holder 75 and the first pipe 77 is connected via the first inlet 19 (supply) to the conduit 17 and is connected via the second inlet 31 (supply) to the conduit 29. The said space is further connected via the outlet 21 to the conduit 23.

Figure 3:
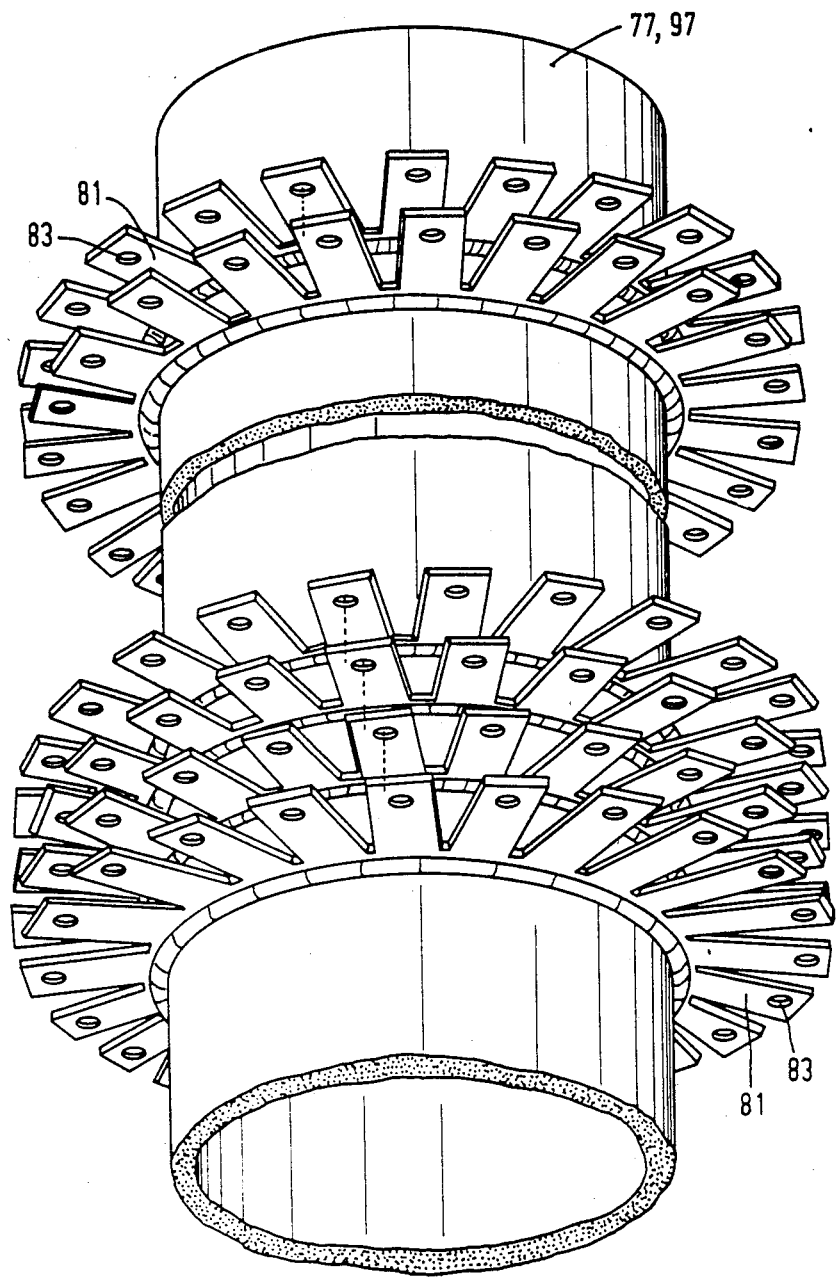
FIG. 3 is a perspective view of a finned pipe with lamellae used in the absorption heat pumps shown in FIGS. 1 and 2.
Figure 4:
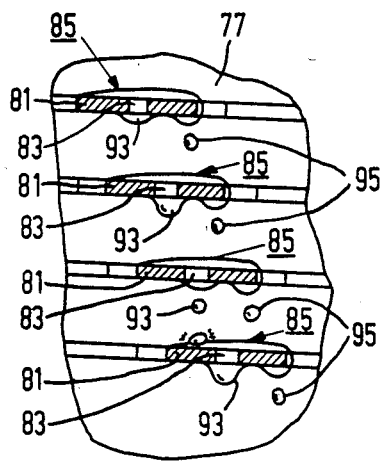
FIG. 4 shows a flow image along a number of lamellae of the pipe shown in FIG. 3 in a first direction.
Figure 5:
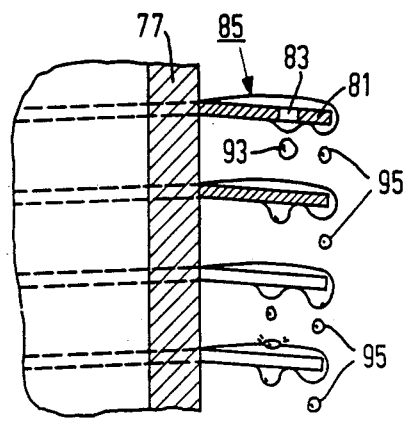
FIG. 5 shows a flow image along a number of lamellae of the pipe shown in FIG. 3 in a second direction.
Figure 6:
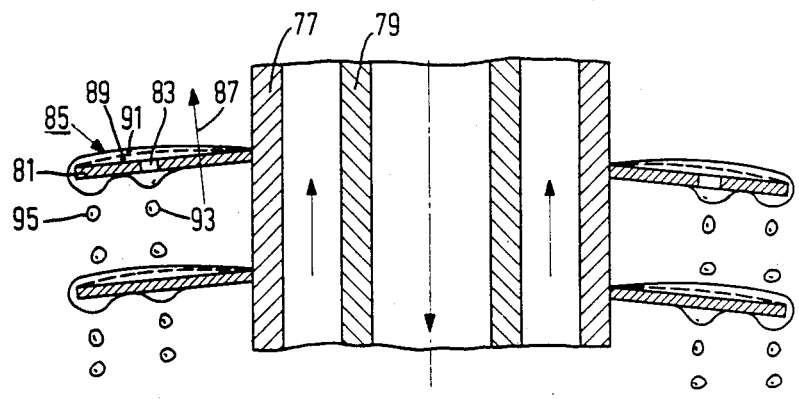
FIG. 6 shows the course of the temperature of the liquid film on a lamella used in an absorber.

In the described preferred embodiment of the absorption heat pump, each of the lamellae 81 is provided with a circular capillary passage 83 (see FIGS. 3 to 6). In the present case, in which the mass pair ammonia/water is used, the diameter of the capillary passages is 2 mm, while the thickness of the lamellae 81 is 1 mm. The vertical distance between adjacent lamellae 81 of successive turns is about 9 mm. Viewed in radial direction, the length of the lamellae 81 is 20 mm, while, viewed in tangential direction, the width of the lamellae 81 is equal to 9 mm. The diameter of the first pipe 77 is equal to 60 mm and the diameter of the first holder 75 is equal to 125 mm, so that the free ends of the lamellae 81 are well clear of the inner wall of the first holder 75. Preferably, the capillary passages 83 are arranged near the centre (viewed in tangential direction) of the lamellae 81. Viewed in radial direction, the capillary passages are located in the front part of the lamellae. As appears from FIGS. 3 to 6, a film 85 of the liquid initially still poor and comparatively hot solution is formed on the upper surface of each lamella 81. Since a comparatively cold heating liquid flows in the first pipe 77, the temperature in the liquid film on a lamella 81 increases, as is indicated in FIG. 6 by an arrow 87. Consequently, an initially poorer colder lower layer 89 and a hotter upper layer 91 already slightly enriched by the ammonia vapour flowing along are effectively formed in the film 85. Solution flows from the colder lower layer 89 into the capillary passage 83, after which a drop 93 is formed, which falls on the film 85 of the subjacent lamella. The capillary passages 83 of adjacent successive turns are shifted with respect to each other so that a falling drop 93 already falls on the subjacent film 85 at an area beside the capillary passage 83 of the subjacent lamella 81. In FIG. 4, it is indicated with reference to four lamellae 81 how the drop formation is developed. It can be seen at the lowermost lamella how a comparatively cold drop 93 brings about a mixing of the hotter upper layer 91 with the colder lower layer 89. Such a mixing takes place on each lamella 81. Due to this mixing, the whole film 85 is rapidly cooled, as a result of which a uniform absorption of the ammonia vapour supplied via the first inlet 19 throughout the film 87 is achieved and a homogeneous distribution of the concentration of work medium in the film is obtained. The ammonia from the evaporator 7 moreover flows on all sides around the falling drops 93 so that an additional absorbing effect is obtained. The solution thus enriched is collected in the lower part of the first holder 75 and is then pumped by the pump 47 to the second holder 65 of the generator 1. In order to prevent that an excess quantity of solution flows downwards along the outer wall of the first pipe and thus would not participate in the mixing process, the free ends of the lamellae 81 are preferably slightly (angle of 0.05 radians) directed downwards (see FIG. 5) in radial direction. Moreover, due to the helical line (pitch angle of 0.05 radians), the lamellae are also slightly directed downwards with a longitudinal edge (see FIG. 4) in tangential direction. This moreover results in that drops 95 are formed, which fall downwards near the free ends and the said longitudinal edges of the lamellae 81. Ammonia vapour also flows around the drops 95 and these drops are enriched by ammonia by the cooling to which they have been subjected on the lamellae 81. Since the drops 95 are formed just before the free ends of the lamellae 81, they each time fall on the liquid film of a subjacent lamella and thus contribute to the mixing process. Due to the fact that the liquid film flows away through the capillary passages, it is ensured that the liquid film remains comparatively thin, as a result of which the heat transfer is improved.

Figure 2:
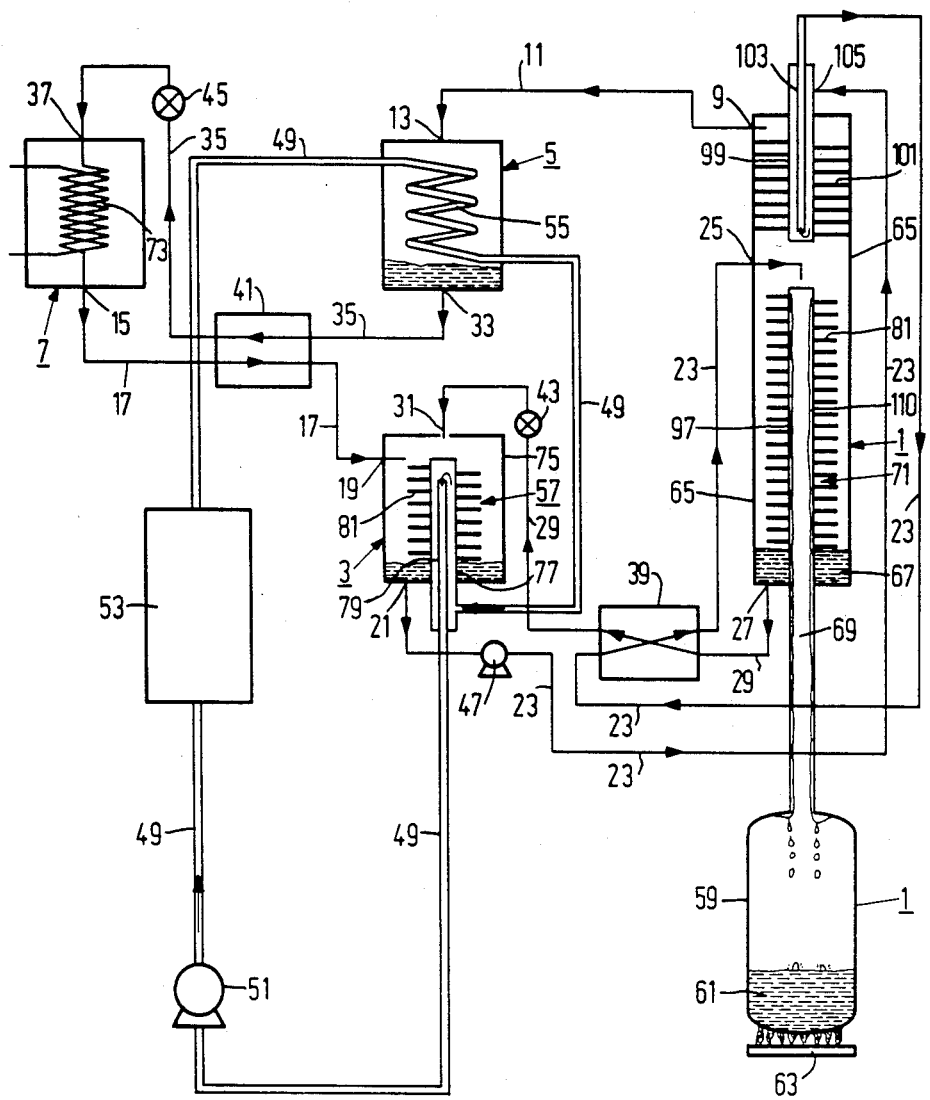
FIG. 2 shows diagrammatically a second embodiment of the absorption heat pump comprising a finned heat-mass-exchanger in the absorber and generator and a finned heat exchanger in the dephlegmator.

The second embodiment of the absorption heat pump shown in FIG. 2 is provided as far as possible with reference numerals corresponding to those in FIG. 1.

The detail FIGS. 3 to 5 also relate to the second embodiment on the understanding that the temperature gradient across the liquid film on the lamellae in the generator is opposite to that in the absorber. This is made clear with reference to the arrows 87 and 109 in FIG. 6 and FIG. 7.

As appears from FIG. 2, the heat-mass-exchanger 57 in the absorber 3 is identical to that in FIG. 1. Instead of the helical heat-mass-exchanger 71 in FIG. 1, in the second embodiment shown in FIG. 2 a heat-mass-exchanger 71 is also used in the generator 1 and this exchanger is provided with a finned pipe. For this purpose, the part of the ascending conduit 69 passed into the second holder 65 is in the form of a straight prolonged part of the part of the ascending conduit located outside the second holder. The circular-cylindrical second holder 65 of the generator 1 thus has a vertically arranged coaxial third metal pipe 97, which constitutes the part of the ascending conduit 69 passed into the second holder 65. The third metal part 97 closed at its upper end is provided with a helical fin which consists of a number of interconnected metal lamellae 81 of the kind shown in FIG. 3 and is therefore of the same kind as the first metal pipe 77 in the absorber 3. The lamellae 81 are arranged so as to be clear ot the inner wall of the second holder 65. There is arranged in line with the third pipe 97 a coaxial finned fourth metal pipe 99, which is closed at its lower end facing the closed upper end of the third pipe 97. The fourth pipe 99 is provided with a metal fin which consists of a number of interconnected lamellae 101 which engage the inner wall of the second holder 65 and are helically wound around the fourth metal pipe 99. The pattern of the lamellae 101 of the fourth pipe 99 is of the kind shown in FIG. 3. The lamellae 101 need not be provided with capillary passages. With the use of the mass pair ammonia/water, this is to be preferred, however. Although the fin constituted by the lamellae 101 may be welded to the outer wall of the fourth pipe 99, in the present case a loose fin is used, which is pressed into the space between the second holder 65 and the outer wall of the fourth pipe 99, which engages with the outer edges of the lamellae 101 the inner wall of the second holder 65 and engages with its inner edge the outer wall of the fourth pipe 99.

Within the fourth pipe 99 is situated a coaxial fifth pipe 103 which is open at both ends and is in communication via its lower end with the conduit 23 connected to the absorber 3. The fifth pipe 103 is preferably thermally insulated or made of thermally insulating material (not shown). The conduit 23 is connected via an inlet 105 to the space between the fourth pipe 99 and the fifth pipe 103 near the upper end of the closed fourth pipe 99. At its upper end the fifth pipe 103 is also connected to the conduit 23 so that the fifth pipe 103 effectively forms a part of the conduit 23. At its one end the fifth pipe is in communication via an inlet 105 through the conduit 23 with the outlet 21 of the absorber 3 and is in communication at its other end via the heat exchanger 39 with the inlet 25 of the generator 1. The space between the second holder 65 and the fourth pipe 99 is connected via the first outlet 9 and the conduit 11 to the inlet 13 of the condenser 5.

It should be noted that the fourth pipe 99 acts as a so-called dephlegmator and therefore is not a heat-mass-exchanger, but a heat exchanger in which the comparatively cold solution from the absorber 3 flowing within the pipe 99 cools the hot ammonia fas flowing along the lamellae 101. Substantially the whole quantity of water vapour still present in the ammonia then condenses. The condensate flows into the poor solution 67 in the lower part of the second holder 65. If capillary passages are present in the lamellae 101, the advantage of a comparatively small film thickness on the lamellae 101 and hence of a better heat transfer is obtained. In the dephlegmator no mass exchange takes place in such a sense that two different masses are brought into contact with each other in order to increase or decrease the concentration of one of these masses in the mixture. Consequently, the dephlegmator is a heat exchanger and not a heat-mass-exchanger.

Figure 7:
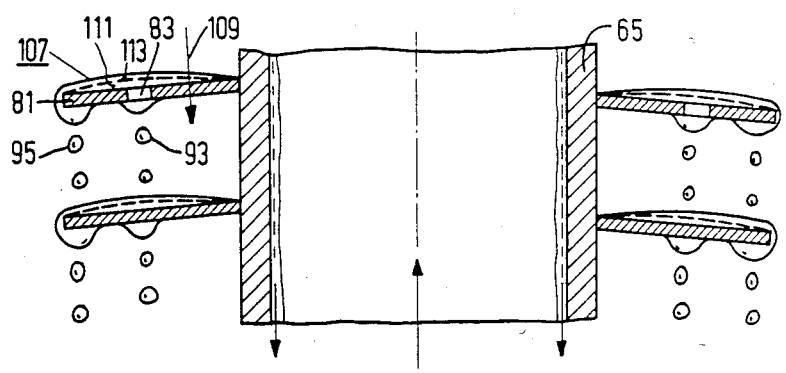
FIG. 7 shows the course of the temperature of the liquid film on a lamella used in a generator.

As appears from FIG. 7, a film 107 of rich solution already preheated in the heat exchanger 39 is formed on the lamellae 81 of the finned pipe 97 in the generator 1. In the liquid form, viewed on the lamella 81, the temperature increases in the direction of an arrow 109. The heat originating from the condensing water vapour 110 on the inner wall of the third pipe 97 forms a comparatively hot lower layer 111 in the film 107. A comparatively cold upper layer 113 in the film 107 sinks upon film evaporation due to its larger weight into the comparatively hot lower layer 111, as a result of which an intensive mixing between the already strongly impoverished lower layer 111 and the less strongly impoverished upper layer 113 is obtained. The mixing is further intensified by drops falling on the film 107, which are formed through the capillary passage 83 of the overlying lamella 81. Moreover, already formed hot gaseous ammonia flows on all sides around the already impoverished drops from the lower layer 111, as a result of which an additional quantity of gaseous ammonia is generated from the falling drops. Due to the intensive mixing of the upper layer 113 with the lower layer 111, a more uniform generation of gaseous ammonia is obtained through the whole film 107. Furthermore, just in front of the free ends of the downwardly directed lamellae and the downwardly directed longitudinal edge of the lamellae, falling drops 95 are formed, from which an additional quantity of ammonia gas is generated by the ascending hot ammonia gas. The drops 95 fall on the liquid film of the underlying lamellae so that an additional mixing in the liquid film is obtained. It should be noted that in the case in which the impoverishing lower layer 111 boils, a further mixing is brought about. In the case of film evaporation, the colder upper layer 113 sinks into the hotter lower layer 111.

Although the invention is described with reference to a preferred embodiment of an absorption heat pump comprising a heat-mass-exchanger in the absorber or generator which is provided with lamellae with capillary passages, it is not limited thereto. Heat pumps comprising heat-mass-exchangers which are wholly constructed in the manner described, but are not provided with capillary passages, also lie within the scope of the invention. The cascade pattern of lamellae leads—also without the capillary passages—to such an intensive mixing in the film layer on the lamellae due to the drops 95 falling from the lamellae and spraying onto underlying lamellae that in many cases a sufficiently strong absorption or generation is obtained. It should be noted that it is known per se from U.S. Pat. No. 3,723,693 to use pipes with segmented fins as heat exchangers. The use of such pipes in the absorber and/or generator of an absorption heat pump requires, however, the recognition of the fact that with the cascade lamellae structure of a vertically arranged pipe also a strongly improved mass exchange can be obtained. It is then essential that the free ends of the lamellae are arranged so as to be clear of the inner wall of the holder in which the pipe is arranged so that it is prevented that an excess quantity of solution flows along the inner wall of the relevant holder and does not participate in the mixing process on the lamellae and is not so strongly cooled or heated either. In the case in which the lamellae would engage the said wall, the transport of the solution therefore takes place for a considerable part in the form of a film along the wall. The absorbing and/or generating action of such a heat-mass-exchanger is not sufficient for absorption heat pumps.

The heat-mass-exchanger described may be used according to choice solely either in the absorber or in the generator. Use in both the absorber and the generator has the additional advantage that in the manufacture of the absorber and the generator the same technology is utilized as far as possible, which leads to a reduction of the cost price. The said advantage also holds if a finned pipe for the dephlegmator is integrated in the holder of the generator, as described with reference to FIG. 2. This moreover results in a compact, but nevertheless readily accessible construction.

Although this is not indicated in FIGS. 1 and 2 for the sake of brevity, the first holder 75 and the second holder 65 are preferably provided along their whole outer wall with thermally insulating material.

Finally, it should be noted that the generator described may be replaced by known generators if the heat-mass-exchanger is used only in the absorber. Instead of a condensing auxiliary medium (water), for example, waste heat or flue gases may be directly conducted to a usual heat exchanger, which is arranged in a vessel containing solution. However, the generator described may also be heated electrically, with waste heat or with flue gases. The solution of ammonia and water used may be replaced by other solutions usual in absorption heat pumps. Furthermore, several parallel arranged finned pipes may be used in the absorber and generator.

Although the invention is described with reference to finned pipes, in which a considerable drop formation takes place near the free ends and the downwardly directed longitudinal seams of the lamellae, it is not limited thereto. The extent to which the said drop formation takes place depends upon a large number of parameters. Important parameters in this case are:
  the liquid flow rate to be processed;
  the mass pair used (surface tension/extent of wetting);
  the sharpness of the edges of the lamellae;
  the value of the angle at which the free ends of the lamellae are directed downwards;
  the value of the pitch angle of the helical line;
  the diameter of the capillary passages.

In, for example, the case of sharp edges of the lamellae and substantially horizontal lamellae, a comparatively small number of drops will be formed near the free ends and the longitudinal edges of the lamellae. The drop formation then mainly takes place below the capillary passages, which process substantially the whole quantity of liquid. In the case of lamellae strongly hanging downwards, both kinds of drop formation occur. The drops formed below the capillary passages then slide along the lower side of the lamellae slightly towards the free ends and the longitudinal edges. In practice, it has to be ascertained empirically, which combination of parameters is to be preferred.

If it is ensured that a sufficient drop formation takes place near the free ends and the longitudinal edges of the lamellae, capillary passages may also be dispensed with. In a considerable number of cases, due to the cascade of lamellae, already such a mixing is obtained without capillary passages that the absorption heat pump has a comparatively high efficiency.

What is claimed is:

1. An absorption heat pump comprising a generator and absorber arranged in a first circuit for a solution of work medium and solvent and a condenser and evaporator arranged in a second circuit for the work medium, in which a first outlet of the generator is connected to the condenser and an outlet of the evaporator is connected to a first inlet of the absorber, which is connected through an outlet to an inlet of the generator, said heat pump being provided with at least one heat-mass-exchanger for varying the temperature and the composition of the solution present therein, characterized in that the heat-mass-exchanger in the absorber is constituted by a finned first metal pipe which is vertically arranged in a first holder and to which a metal fin is secured, which consists of a number of interconnected lamellae arranged so as to be clear of the holder and wound helically around the first pipe, the adjacent lamellae of successive turns overlapping each other in part, viewed in the circumferential direction of the pipe, while the space between the first holder and the first pipe is connected via the said first inlet to the said outlet of the evaporator and is connected via an outlet to the said inlet of the generator, which is connected via a second outlet to a second inlet of the absorber, the inner space of the first pipe forming part of a transport conduit for a cooling medium.

2. An absorption heat pump as claimed in claim 1, characterized in that the first pipe closed at its upper end surrounds a coaxial second pipe open at both ends, which is in communication through its open upper end with the transport conduit for the cooling medium connected to the space between the first and the second pipe, this cooling medium leaving the second pipe at the lower end.

3. An absorption heat pump as claimed in claim 1, characterized in that the generator comprises a third finned metal pipe which is vertically arranged in a second holder and is closed at its upper end, a metal fin secured to the third pipe consisting of a number of interconnected lamellae which are arranged so as to be clear of the second holder and are wound helically around the third pipe, while the space between the second holder and the third pipe is connected near the upper end of the third pipe via a supply to the said outlet of the absorber and is connected near the lower end of the third pipe via an outlet to the second inlet of the absorber, the inner space of the third pipe being in communication with a supply of a gaseous heating medium.

4. An absorption heat pump as claimed in claim 3, characterized in that the second holder comprises a coaxial finned fourth metal pipe which is arranged in line with the third pipe and is located above the third pipe and is closed at its end facing the third pipe, a metal fin secured to the fourth pipe consisting of a number of interconnected lamellae which engage the inner wall of the second holder and are helically wound around the fourth pipe, wherein the space between the second holder and the third pipe is connected via a supply located near the upper end of the third pipe to the said outlet of the absorber and is connected near the lower end of the third pipe via an outlet to the second inlet of the absorber, while within the fourth pipe there extends a coaxial fifth pipe which is surrounded by the fourth pipe, is open at both ends and is in open communication via its lower end with the said outlet of the absorber and is connected at its upper end to the said inlet of the generator, the space between the second holder and the fourth pipe being connected near the upper end of the fourth pipe to an inlet of the condenser.

5. An absorption heat pump as claimed in claim 1, characterized in that the lamellae of the first finned pipe in the absorber and the third finned pipe of the absorber are provided with capillary passages, the capillary passage of an overlying lamella located above the surface of an underlying lamella being situated in a shifted position with respect to the capillary passage of the said underlying lamella.

* * * * *